United States Patent [19]

Nagao et al.

[11] 4,152,409
[45] May 1, 1979

[54] METHOD FOR CARRYING OUT AIR OXIDATION AND FOR ADDING FINE BUBBLES TO A LIQUID

[75] Inventors: Jun-Ichi Nagao; Hiroyuki Machiguchi; Yoshikazu Yamamichi, all of Okayama, Japan

[73] Assignee: Dowa Mining Co., Ltd., Tokyo, Japan

[21] Appl. No.: 839,902

[22] Filed: Oct. 6, 1977

Related U.S. Application Data

[62] Division of Ser. No. 765,588, Feb. 4, 1977, Pat. No. 4,101,286.

[51] Int. Cl.² ............ C01D 5/00; B01D 47/02; C02B 1/34
[52] U.S. Cl. ............ 423/659; 423/DIG. 3; 423/551; 210/63 R; 261/76; 366/101
[58] Field of Search ............ 423/659, 555, 204, 207, 423/206 R, 551; 23/283, 284; 210/63; 261/123, 124, 76; 366/101

[56] References Cited

U.S. PATENT DOCUMENTS

| | | | |
|---|---|---|---|
| 1,536,463 | 5/1925 | Westling | 423/524 |
| 1,986,889 | 1/1935 | Fulton | 423/547 |
| 3,202,281 | 8/1965 | Weston | 423/561 R |
| 3,278,271 | 10/1966 | Kono et al. | 423/659 |
| 3,549,314 | 12/1970 | Shah | 423/DIG. 3 |
| 3,730,700 | 5/1973 | Groewveld | 423/659 |
| 3,758,277 | 9/1973 | Cook et al. | 423/396 |
| 3,833,719 | 9/1974 | Kuertew et al. | 423/659 |

Primary Examiner—O. R. Vertiz
Assistant Examiner—Gary P. Straub
Attorney, Agent, or Firm—Flynn & Frishauf

[57] ABSTRACT

A method of carrying out air oxidation comprises substantially continuously feeding liquid and air to an oxidizing tank (A) via a bubble forming device (D) which is fixed at the bottom of the tank, feeding a part of the liquid out of the tank via a lower port to a gas-liquid separating device (B) and then returning the liquid free from gas from the separating device to the oxidizing tank via the bubble forming device. Air separated from the liquid in the separating device is returned to the oxidizing tank and the finished solution is overflowed out from an upper portion of the oxidizing tank. The bubble forming device operates by feeding air into the lower chamber thereof via a nozzle which is aligned with and directed toward an orifice in a partition which divides the bubble forming device into two chambers. The liquid is fed into the lower chamber and the liquid and air are fed as a mixture through the orifice to impinge an upper wall of the upper chamber of the bubble forming device to more fully mix same. The fluid discharged from the upper chamber has an enormous number of very fine air bubbles therein.

12 Claims, 3 Drawing Figures

METHOD FOR CARRYING OUT AIR OXIDATION AND FOR ADDING FINE BUBBLES TO A LIQUID

This is a division, of application Ser. No. 765,588, filed Feb. 4, 1977 now U.S. Pat. No. 4,101,286.

This invention relates to a process of bubble-forming particularly suitable for carrying out air oxidation, particularly using the bubble forming process.

Air oxidation in a liquid phase is one of the reactions most commonly employed in various industrial processes. In carrying out this reaction, air is generally blown into the reaction tank through an air-inlet provided at the bottom or in the lower portion of the sidewall of the tank. Air must be blown into the liquid in such a way that the bubbles formed are as small as possible. The smaller the bubbles, the better the contact between air and the liquid. Thus, at or near the air-inlet a means to change a stream of air into small bubbles is commonly employed. If this means enables the formation of the smallest bubbles, the oxidation will be accomplished most efficiently. As a means to satisfy such requirements, a perforated board for dispersing air is often used fixed inside an oxidation tank. This type of bubble-forming means, however, has a defect in that it fails to provide bubbles in a liquid phase that are small enough to ensure rapid and efficient oxidation. Various attempts have been made to improve the device. One example of such attempts is the employment of an impeller type agitator in combination with said perforated board. The agitator rotates at a high rate to help formation of small bubbles in the liquid and this really improves the efficiency of air oxidation. This type of device, however, has a defect in that the abrasion of rotating or sealing parts is substantial and therefore devices of this type do not have a long operating life. Another defect which goes along with such device is that generally it is not removable and it has to be handled together with the oxidizing vessel to which said device is attached. Thus, the development of a novel bubble-forming device free from all these defects has long been desired. In response to such demand, a bubble-forming device as shown in FIG. 1 which has no moving parts and is easy to fit and remove has been developed by the present inventors.

DETAILED DESCRIPTION

Figure 1:
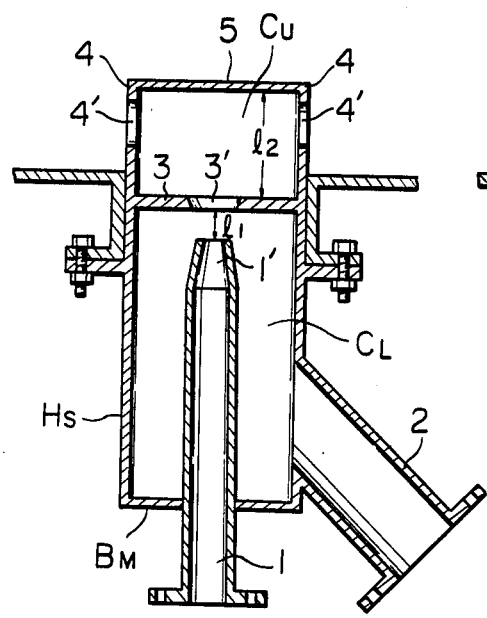
FIG. 1 shows a sectional view of the single-nozzle type bubble-forming device of the present invention.

Referring now to FIG. 1, the numerical symbol (1) represents an air-inlet pipe having a nozzle (1') on its top end through which air is blown into the liquid. The numerical symbol (2) represents a liquid-inlet pipe provided at the lower portion of the device through which a liquid feed is introduced. The device is divided into two chambers, the upper chamber ($C_U$) and the lower chamber ($C_L$), by a partition board (3) which has an orifice (3') at a position corresponding to the nozzle tip. The upper chamber ($C_U$) is a space within the device and above the partition board (3), and the lower chamber is a space below the same. The upper chamber may also be referred to as "a bubble dispersing zone". A number of orifices (4') are provided in the wall (4) which surrounds the upper chamber ($C_U$) to allow the discharge of air-liquid mixture passing therethrough. The upper chamber ($C_U$) opens to the lower chamber ($C_L$) at the orifice (3') and when the stream of air rapidly passes through this orifice (3') towards the upper chamber ($C_U$), the liquid near this orifice (3') is strongly pulled into the stream and immediately thereafter the stream of air-liquid mixture thus formed collides with the ceiling board (5) of the bubble-forming device. This colliding helps the proper dispersion of air into the liquid and promotes the formation of smaller bubbles. Soon after that, the fully mixed fluid containing an enormous number of very fine air bubbles thus produced is discharged through the orifices (4') into the oxidizing zone in the reaction tank. Thus, the oxidizing reaction in a liquid phase is carried out in such a state that very fine bubbles are properly dispersed in the liquid and as a result air oxidation is accomplished very efficiently.

The following example will illustrate the advantages of using this new type of bubble-forming device.

EXAMPLE 1

A single-nozzle bubble-forming device of the type as shown in FIG. 1 20 m/m in outer diameter was fitted to the bottom of an oxidizing tower 300 mm in the inner diameter and 6 m high. A stock solution or an aqueous solution of basic aluminum sulfate containing absorbed therein 0.6 g/l of sulfer dioxide gas was fed through the liquid-inlet pipe (2) into the oxidizing tower at a flow rate of 6.0 M$^3$/Hr. Through the nozzle (1'), air was blown into the same tower at a flow rate of 3.2 NM$^3$/Hr. Thus, the ratio of L/G was almost equal to 1.9. When checked at the top level, the $SO_2$ content of the solution in the oxidizing tower was 0.05 g/l or less and the analysis of the air discharged from the top of the tower showed that the $SO_2$ content thereof was substantially nil and the $O_2$ content of the same was 6.0% by volume, which showed that the percentage of oxygen which was consumed effectively for the oxidation in the liquid based on the total oxygen charge (hereinafter simply referred to as "oxygen efficiency") was about 76%. When the bubble-forming device was checked after six months' continuous operation using the same, no substantial abrasion was observed in any of the nozzle part (1'), the orifices (3'), the ceiling board part (5), the orifices (4') for the gas-liquid mixture passing therethrough and the like. In addition, no substantial decrease was observed in the "oxygen efficiency" defined above. On the other hand, when another type of bubble-forming device having a turbine blade was used for the same purpose under the same conditions, the "oxygen efficiency" was at most in the order of 50% or so, and the abrasion loss was serious at rotating parts, particularly at sealing parts. The leakage of the liquid was observed at the abraded parts mentioned above. During the operation, the "oxygen efficiency" showed a decreasing tendency. After six months' continuous operation using the same, it was observed that repair of abraded parts was required.

As is clear from the above description, this new type of bubble-forming device is very simple in its construction and is easy to fit into and to remove from the oxidation tank. Further, since it has no moving parts, there's no worry about any abrasion problem. Lastly, it is not expensive. To illustrate the performance of this device, when a liquid with a viscosity of about 5 cp is used, the average diameter of the bubbles to be formed in the liquid will be on the order of about 1 mm or less. Thus, the total surface area of the bubbles in contact with the liquid is very large, and it is observed that the size of the bubbles does not increase during their rising movement towards the liquid surface in the reaction tank. As a result, the oxidizing reaction in a liquid phase is accomplished with high efficiency.

It is found, however, that the mere application of this device to an oxidation tank does not always ensure the accomplishment of rapid oxidation in a liquid phase in good efficiency. It is empirically found that in the application of the device, some requirements must be fulfilled to expect satisfactory results. That is, the ratio of liquid flow rate to gas flow rate (L/G) must be at least $\frac{1}{2}$ ($M^3/NM^3$) to ensure the formation of the desired fine bubbles; the velocity of the stream passing through the orifice (3') in the partition board (3) must be at least 3 m/sec.; the interval ($l_1$) between the nozzle tip (1') and the lower surface of the partition board (3) must be in the region of about 0.8–2.0 times as large as the opening diameter of the orifice (3'); the distance ($l_2$) from the upper surface of the orifice (3') or the partition board (3) to the inner surface of the ceiling board (5) must be in the region of about 1.0–5.0 times as large as the opening diameter of the orifice (3'); and the like. Without satisfaction of these requirements, the application of the device is not fully successful.

In Example 1, the oxidizing reaction of sulfite ion accomplished in an aqueous solution of basic aluminum sulfate is illustrated. This reaction is carried out as a step in a process for removing $SO_2$ from various effluent gasses which is called by the name of "Basic Aluminum Sulfate-Gypsum Process". Usually, the reaction is carried out at the L/G ratio such as, for example, 1/1, which is well within the limited range of $\frac{1}{2}$ or greater. Thus, there is no difficulty in accomplishing the reaction with success. However, the above bubble-forming device is not always applicable to every oxidizing reaction system to be carried out in a liquid phase. Because, as already mentioned, it is empirically known that the ratio of liquid flow rate to gas flow rate, L/G, must be $\frac{1}{2}$ or greater to expect satisfactory results with said bubble-forming device. In the other words, the gas flow rate G must be equal to or less than two times the flow rate of the liquid L. Such a requirement is not always fulfilled. For example, in case an aqueous solution of sodium sulfite and acidic sodium sulfite is subjected to air oxidizing treatment, the amount of air to be fed to the oxidation tank is something about 2500 times as much as the amount of the liquid to be fed to the same tank. Thus, it is impossible to satisfy the requirement of L/G being $\frac{1}{2}$ or less. In such a case, mere application of this device to the bottom of the oxidation tank does not ensure the desired good results with respect to the oxidation in a liquid phase. Hence, it is appreciated to develop a versatile device or equipment which is applicable to all such cases including the case as mentioned above. The present inventors have finally succeeded in doing so.

Figure 2:
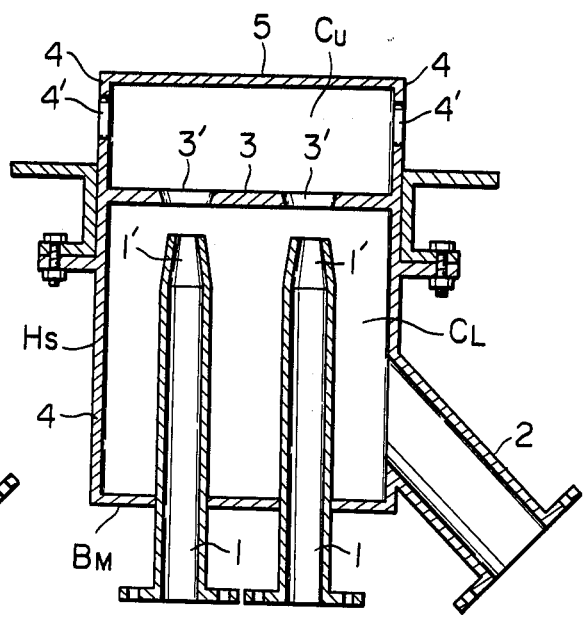
FIG. 2 shows a sectional view of the multi-nozzle type bubble-forming device of the present invention.

The first step for improving the above-mentioned type of bubble-forming device is to change it into a multi-nozzle type which is more flexible to varying amounts of both liquid and air as well as the mixing ratio of them. The modified multi-nozzle type bubble-forming device of the present invention has a construction as shown in FIG. 2. Referring now to FIG. 2, the improved device comprises a housing ($H_S$) consisting of a ceiling board (5), a side-wall (4) and a bottom ($B_M$). The inside of the housing is divided into two chambers by a horizontal partition board (3) having at least two orifices (3') therein corresponding in number to the nozzles (1') placed thereagainst. The lower chamber ($C_L$) has (a) two or more gas-introducing pipes (1) having a nozzle (1') on their top which are vertically fixed at the bottom ($B_M$) of the housing ($H_S$) leaving a narrow space between the nozzle tip (1') and the orifice (3'); and (b) a liquid-introducing pipe (2) through which liquid is taken into said lower chamber ($C_L$). The upper chamber ($C_U$) has (a) a ceiling board (5), placed a short distance from the partition board (3), against which a high velocity flow of the gas-liquid mixture passed through the orifice (3') is to be crushed; and (b) orifices (4') perforated in the side wall (4) through which the fully mixed gas-and-liquid is discharged.

Since this improved type of bubble-forming device has a larger number of nozzles, the load on each nozzle is reduced, and the capacity to blow air into the device is greatly increased. In addition, since the number of rapid flows passing through the orifices to come up to crush against the ceiling board is increased, bubble-forming conditions in the upper chamber are improved and bubbles in good conditions are generated even under the conditions where the L/G ratio is less than $\frac{1}{2}$ and as a result satisfactory oxidation is ensured.

Figure 3:
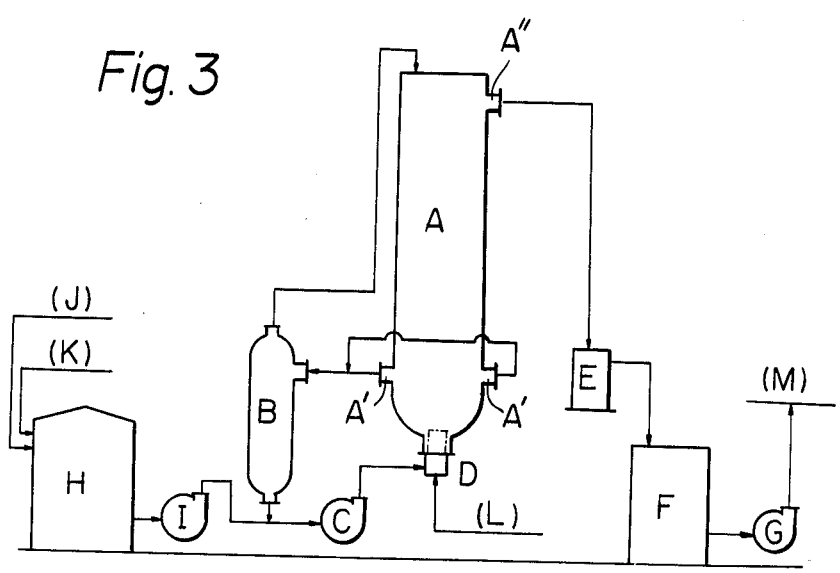
FIG. 3 shows a schematic diagram of the process in accordance with the present invention.

The second step for improving the device is directed to the completion of an industrially feasible process which is always applicable to the above-mentioned air oxidizing reaction under any conditions. To fulfill such requirements, an improved process for air oxidation in a liquid phase as shown in FIG. 3 has been developed by the present inventors. Referring now to FIG. 3, (A) represents an oxidizing tower in which air oxidizing reaction in a liquid phase, or similar gas-liquid reaction, is to be carried out. A multi-nozzle bubble forming device (D) having the construction as shown in FIG. 1 or FIG. 2 is fitted to this oxidizing tower (A) at the bottom thereof. The tower (A) has at the lower portion of its side-wall at least one circulating liquid exit (A'), and at the upper portion of its side-wall at least one overflow port (A"). As regards the other alphabetical symbols, (B) represents a gas-liquid separating tank, (C) represents a circulating pump, (E) represents a cushion tank for the finished solution, (F) represents a storage tank for the finished or product solution, (G) represents a pump for discharging the finished or product solution into a thickener and the like (M), (H) represents a liquid conditioning tank, (I) represents a feed pump, (J) represents liquid raw material such as water, (K) represents other raw material such as $Na_2SO_3$, (L) represents compressed air and (M) represents a thickener and the like. Through the bubble-forming device (D), compressed air (L) and a mixed stream comprising the stock solution from the liquid conditioning tank (H) and the circulating liquid taken out of the exit (A') are continuously fed to the oxidizing tower (A). A controlled amount of the liquid is continuously taken out of the oxidizing tank (A) via the exit (A') which joins the stream of the stock solution before the mixture is fed via the device (D) to the oxidizing tower (A). The circulating liquid passes through the gas-liquid separating tower (B) before it joins the stock solution from the tank (H). Air separated in the tank (B) is returned to the oxidizing tank (A) by the conduit connected to the upper portion of the oxidizing tank (A). The finished solution overflows from the overflow port (A") to a storage tank (F). A cushion tank (E) may preferably be placed between said overflow port (A″) and the storage tank (F). The finished solution in the storage tank (F) is delivered to subsequent processes such as a thickener (M) by a pump (G).

As explained previously, when it is contemplated to oxidize sodium sulfite or acidic sodium sulfite by air in an aqueous solution thereof, a very large amount of air, considering the amount of the liquor, is required to be fed to the oxidizing tower because of the considerably high sulfite ion content of the solution. For example, the L/G ratio may often be in the region of 1/2500 or less. In such a case, the mere application of the single-nozzle bubble-forming device as shown in FIG. 1 to an oxidation tank will not ensure satisfactory oxidation.

However, the application of the multi-nozzle bubble-forming device as shown in FIG. 2 along with the process as shown in FIG. 3 will overcome any difficulties and ensure satisfactory results as will be clear from the following examples.

EXAMPLE 2

Air oxidation of sodium sulfite was carried out in an aqueous medium in accordance with the process as shown in FIG. 3. A two-nozzle type bubble-forming device (D) 20 mm in outer diameter was fixed at the bottom of an oxidizing tower (A) 300 mm in the inner diameter and 6 m high by fastening with bolts and nuts. Through the nozzles of this device (D), compressed air at a pressure of about 2.5 kg/cm$^2$ was blown into the oxidizing tower (A) at a rate of 12 NM$^3$/Hr. The oxidizing tower was almost filled with the aqueous solution up to the overflow level. Part of the solution was continuously taken out of the oxidizing tower via the port (A′) to provide a circulating liquid stream which was returned to the oxidizing tower (A) passing through the gas-liquid separator (B), the circulating pump (C) and the multi-nozzle bubble-forming device (D). A stock solution comprising water and Na$_2$SO$_3$ was taken out of the liquid conditioning tank (H) and was delivered by the feed pump (I) to be made to join the circulating liquid stream before the resulting mixture was fed to the bubble-forming device (D). The feed rate of the stock solution of sodium sulfite containing 5 g/l SO$_2$ was 58 l/Hr and the flow rate of the circulating liquid was 6 M$^3$/Hr. The oxidation was effected at a temperature of about 60° C. The "oxygen efficiency" was 20%. This experiment may hereinafter be referred to as a "small scale run". The amount of blown-in air per nozzle was 12 NM$^3$/Hr.

EXAMPLE 3

Instead of said "small scale run", a "middle scale run" was carried out under the following conditions. Namely, a two-nozzle type bubble-forming device 100 mm in outer diameter was fixed at the bottom of an oxidizing tower 900 mm in the inner diameter and 8 m high. The flow rate of feed air at 2.5 kg/cm$^2$ was 100 NM$^3$/Hr, and the flow rate of the circulating liquid was 80 M$^3$/Hr. The stock solution of sodium sulfite containing 50 g/l SO$_2$ and having a pH value of 7 was continuously fed to the oxidizing tower at a flow rate of 480 l/Hr after being made to join the circulating liquid. The oxidation was carried out at a temperature of about 60° C. The "oxygen efficiency" was 20%.

When the amount of circulating liquid was decreased, the size of the bubbles increased and in turn the "oxygen efficiency" decreased.

EXAMPLE 4

Another middle-scale experiment was carried out under the following conditions. A four-nozzle type bubble-forming device 100 mm in the outer diameter was fixed to the same oxidizing tower as mentioned with respect to the above middle-scale experiment. The amount of air blown in was 200 NM$^3$/Hr and the flow rate of circulating liquid was 60 M$^3$/Hr. The stock solution containing 50 g/l Na$_2$SO$_3$ was continuously fed at a feed rate of 1920 l/Hr. The oxidation was effected at a temperature of 60° C. The "oxygen efficiency" was 20%.

When the experiment was carried out under the same conditions except that the stock solution containing 200 g/l Na$_2$SO$_3$ was fed at a feed rate of 480 l/Hr, the "oxygen efficiency" was 20%.

EXAMPLE 5

A large-scale experiment was carried out under the following conditions. At the bottom of an oxidizing tower 1.8 meter in inner diameter and 8.0 m high, eight sets of 4-nozzle type bubble-forming devices 100 mm in outer diameter were fixed and the experiments were carried out by a batch process with circulation of the liquid. Other conditions for the reactions were as shown in the following Table 1.

Table 1

| Experiment No. | 0 | 1 | 2 | 3 | 4 |
|---|---|---|---|---|---|
| Na$_2$SO$_3$ Initial concentration (g/l) | 254.0 | 253.0 | 227.4 | 49.0 | 119.7 |
| Final (g/l) | Tr | Tr | 0.85 | Tr | 0.3 |
| pH of original solution | 6.5 | 6.3 | 6.4 | 6.91 | 6.90 |
| Amount of air blown in (NM$^3$/Hr) | 500 | 492 | 474 | 117.2 | 926 |
| Rate of liquid circulation (M$^3$/Hr) | 250 | 253 | 250 | 459 | 373 |
| Time required for oxidation (Hr) | 100 | 21.0 | 21.0 | 2.33 | 6.75 |
| Capacity coefficient (kg-mol/m$^3$.Hr) | 0.024 | 0.097 | 0.086 | 0.157 | 0.116 |
| Oxygen coefficient (%) | 5.0 | 22.8 | 21.3 | 14.2 | 15.0 |
| Number of nozzles in operation | 1 | 4 | 4 | 8 | 6 |

EXAMPLE 6

Using the same equipment as mentioned in Example 5, continuous oxidation was carried out with the stock solution containing 200 g/l Na$_2$SO$_3$ feeding at a rate of 1,200 l/Hr. The "oxygen efficiency" was 20% and the COD of the finished solution was 50 ppm or less. The amount of air blown in was 500 NM$^3$/Hr and the flow rate of circulating liquid was 250 M$^3$/Hr.

What is claimed is:

1. A method of carrying out an air oxidation reaction in a liquid phase, comprising:
   substantially continuously feeding liquid and air at respective flow rates to an oxidizing tank via a bubble-forming device having no moving parts, the bubble-forming device being fixed at the bottom of said oxidizing tank to carry out air oxidation therein;
   feeding a part of the liquid out of the oxidizing tank via a lower port provided at the lower portion of said oxidizing tank to a gas-liquid separating device;

returning the liquid free from gas from the separating device to the oxidizing tank through the bubble-forming device;

supplying a stock solution from a liquid-conditioning tank and mixing the returned liquid from the gas-liquid separating device with the stock solution before the resulting mixture is fed to the bubble-forming device;

maintaining the ratio of total liquid flow rate and total gas flow rate to said bubble-forming device at at least ½ ($M^3/NM^3$);

returning the air separated from the liquid in the gas-liquid separating device to the oxidizing tank; and overflowing out the finished solution from an upper overflow port located at the upper portion of said oxidizing tank;

the step of substantially continuously feeding liquid and air to an oxidizing tank via a bubble-forming device, comprising:

feeding air into the lower chamber of a two-chamber bubble-forming device via at least one nozzle, said at least one nozzle being aligned with and directed toward a respective orifice in a partition which divides said bubble-forming device into said two chambers, the air being fed via said nozzle to maintain the velocity of the stream passing through said orifice at at least 3 m/sec., a narrow space being provided between the nozzle tip of said at least one nozzle and the opening of its respective orifice, said narrow space being between about 0.8–2.0 times as large as the opening diameter of said orifice;

feeding said liquid into said lower chamber of said bubble-forming device via a conduit;

feeding said liquid and the outlet air of said at least one nozzle as a mixture through said respective orifice in said partition against the upper wall of the upper chamber of said bubble-forming device to more fully mix same, the distance between the upper surface of said partition and the lower surface of said upper wall of said upper chamber being about 1.0–5.0 times as large as said opening diameter of said orifice; and discharging said fully mixed fluid containing an enormous number of very fine air bubbles from an orifice in the upper chamber of said bubble-forming device and into said oxidizing tank.

2. The process of claim 1 comprising returning the liquid free from gas from the separating device to the bubble-forming device of the oxidizing tank via a circulating pump.

3. The method of claim 1 comprising supplying the stock solution from the liquid-conditioning tank by means of a feed pump.

4. The method of claim 1 comprising feeding the overflowed finished solution from the upper port of said oxidizing tank to a storage tank.

5. The method of claim 4 comprising feeding said overflowed finished solution to said storage tank via a cushion tank.

6. The method of claim 1 comprising locating said lower port at the lower portion of the side wall of said oxidizing tank.

7. The method of claim 1 comprising locating said upper overlow port at the side wall of the upper portion of said oxidizing tank.

8. The method of claim 1 wherein said separated air is returned to the upper portion of said oxidizing tank.

9. The method of claim 1 wherein said orifice for discharging said fully mixed fluid is located in an upper side wall of said bubble-forming device.

10. A method of carrying out gas-liquid contact and to create a large number of fine air bubbles in the liquid in a two-chamber bubble-forming device, comprising:

feeding air into the lower chamber of the two-chamber bubble-forming device via at least one nozzle, said at least one nozzle being aligned with and directed toward a respective orifice in a partition which divides said bubble-forming device into said two chambers, the air being fed via said nozzle to maintain the velocity of the stream passing through said orifice at at least 3 m/sec., a narrow space being provided between the nozzle tip of said at least one nozzle and the opening of its respective orifice, said narrow space being between about 0.8–2.0 times as large as the opening of said orifice;

feeding said liquid into said lower chamber of said bubble-forming device via a conduit;

maintaining the ratio of total liquid flow rate and total gas flow rate to said bubble-forming device at at least ½ ($M^3/NM^3$);

feeding said liquid and the outlet air of said at least one nozzle as a mixture through said respective orifice in said partition against an upper wall of the upper chamber of said bubble-forming device to more fully mix same, the distance between the upper surface of said partition and the lower surface of said upper wall of said upper chamber being about 1.0–5.0 times as large as said opening diameter of said orifice; and then discharging said fully mixed fluid containing an enormous number of very fine air bubbles from an orifice in the upper chamber of said bubble-forming device.

11. The method of claim 10 wherein said orifice for discharging said fully mixed fluid is located in an upper side wall of said bubble-forming device.

12. The method of claim 10 comprising feeding said air into said lower chamber via a plurality of nozzles.

* * * * *